United States Patent
Cosentino et al.

(10) Patent No.: US 7,012,032 B2
(45) Date of Patent: Mar. 14, 2006

(54) TEAR RESISTANT PEELABLE SEAL FOR CONTAINERS

(75) Inventors: Steven R. Cosentino, Quinton, VA (US); Stephen K. Franzyshen, Richmond, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 94 days.

(21) Appl. No.: 10/714,144

(22) Filed: Nov. 14, 2003

(65) Prior Publication Data

US 2004/0132363 A1 Jul. 8, 2004

Related U.S. Application Data

(63) Continuation-in-part of application No. 10/300,352, filed on Nov. 20, 2002.

(51) Int. Cl.
| | |
|---|---|
| B32B 15/001 | (2006.01) |
| B32B 27/00 | (2006.01) |
| B32B 15/004 | (2006.01) |
| B29D 22/00 | (2006.01) |
| B29D 23/00 | (2006.01) |

(52) U.S. Cl. ............... 442/16; 442/394; 428/423.7; 428/35.9; 428/36.1; 428/343

(58) Field of Classification Search .......... 442/50, 442/394, 16; 428/35.7, 35.9, 36.1, 343, 423.7, 428/423.9
See application file for complete search history.

(56) References Cited

U.S. PATENT DOCUMENTS

| | | |
|---|---|---|
| 3,107,139 A | 10/1963 | Cornforth et al. |
| 3,309,260 A | 3/1967 | Boese |
| 3,531,365 A | 9/1970 | Melvin |
| 3,629,047 A | 12/1971 | Davison |
| 3,871,947 A | 3/1975 | Brekken |
| 3,908,650 A | 9/1975 | Dunshee et al. |
| 3,995,087 A | 11/1976 | Desanzo |
| 4,165,210 A | 8/1979 | Corbett |
| 4,269,322 A | 5/1981 | Larson |
| 4,375,494 A | 3/1983 | Stokes |
| 4,489,120 A | 12/1984 | Hollinger, Jr. |
| 4,585,682 A | 4/1986 | Colarusso et al. |
| 4,653,640 A | 3/1987 | Akao |

(Continued)

FOREIGN PATENT DOCUMENTS

GB 2 037 658 A 7/1980

(Continued)

OTHER PUBLICATIONS

Du Pont Teijin Films; Application Profile Mylar® polyester film; Mylar® OL for cosmetic samples—blister packaging; 2001; 2 pp.

(Continued)

*Primary Examiner*—Terrel Morris
*Assistant Examiner*—Lynda M. Salvatore
(74) *Attorney, Agent, or Firm*—RatnerPrestia

(57) ABSTRACT

A tear resistant seal made from a recyclable multilayer structure that consists of an oriented polymer film layer a thermal bonding polymer layer on the oriented polymer layer inner surface substantially coextensive thereto, and a reinforcing scrim polymer layer also having an inner surface adjacent and substantially coextensive with the thermal bonding polymer layer. The polymer film layer and the bonding polymer layer are co-extruded layers having a chemical composition that permits recycling without separating the layers. The scrim layer also has a similar chemical composition, permitting recycling following lamination, thereby permitting the recovery of waste material during production runs by the simple recycling of the complete laminated structure.

15 Claims, 1 Drawing Sheet

U.S. PATENT DOCUMENTS

| | | | |
|---|---|---|---|
| 4,679,519 A | | 7/1987 | Linville |
| 4,695,503 A | * | 9/1987 | Liu et al. .................... 428/207 |
| 4,844,246 A | * | 7/1989 | Harrison et al. ............ 206/223 |
| 4,871,406 A | | 10/1989 | Griffith |
| 5,088,603 A | | 2/1992 | Kirkpatrick |
| 5,108,356 A | | 4/1992 | Rickenbach |
| 5,143,766 A | | 9/1992 | Wenz et al. |
| 5,172,812 A | | 12/1992 | Wharton et al. |
| 5,372,268 A | | 12/1994 | Han |
| 5,626,947 A | * | 5/1997 | Hauer et al. ............. 428/195.1 |
| 5,927,535 A | | 7/1999 | Goth |
| 5,985,437 A | | 11/1999 | Chappell, Jr. et al. |
| 6,030,477 A | | 2/2000 | Olvey |
| 6,191,057 B1 | | 2/2001 | Patel et al. |
| 6,240,708 B1 | | 6/2001 | Kassouni |
| 6,287,658 B1 | | 9/2001 | Cosentino et al. |
| 6,357,504 B1 | | 3/2002 | Patel et al. |
| 6,604,307 B1 | | 8/2003 | Cahill et al. |
| 2003/0003249 A1 | | 1/2003 | Benim et al. |
| 2004/0132363 A1 | | 7/2004 | Cosentino et al. |

FOREIGN PATENT DOCUMENTS

| | | | |
|---|---|---|---|
| WO | WO 2004/045848 A1 | | 6/2004 |

OTHER PUBLICATIONS http://www.h-b.com/page_18.htm, # Fiberweb® Thru-Wall Flashing.

http://supremeinsulation.com/products/fiber/fiber_supp. htm, Fiber Glass Metal Building Insulation 202-96.

* cited by examiner

TEAR RESISTANT PEELABLE SEAL FOR CONTAINERS

CROSS REFERENCE TO RELATED APPLICATIONS

This application is a Continuation in Part of U.S. patent application Ser. No. 10/300,352, filed Nov. 20, 2002, the contents of which are incorporated in their entirety herein by reference.

FIELD OF THE INVENTION

This invention relates to containers and particularly to a tear resistant peelable sealing lid employing a recyclable multilayer structure.

BACKGROUND OF THE INVENTION

Sheets of multi-layered materials have been used to prepare seals to seal the openings of containers from air and contaminants. A typical seal consists of a sheet of metal foil bearing a layer of heat sealable material for bonding the foil to the lip of a container, for example, a plastic tray type food package, a bottle or a blister package. When used to seal a bottle, the seal is typically die-cut from sheets of a multi-layered material and sealed by means of heat to the lip of the container. When the containers are blister type packages, that is a cavity in a larger sheet, the seals are usually in the form a sheet cover that extends across the blister package opening or across an array of a plurality of such blisters. Plastic food containing trays are widely used to contain meals that require cooking or heating, and are usually deeper than the typical blister packages, having a top lip that provides a small surface on which is removably adhered a lid, sealing the package.

Seals and lids can be constructed to have a tab that extends outwardly from the periphery of the seal so that a user can grasp the tab to aid in removing the seal from the container. In an alternate arrangement when the seal is used with a blister type package the seal may include a scored edge that may be lifted to provide a grip to remove the seal.

The seal may be external, as in the case of a blister package where the seal is the outermost element of the package or it may be an inner seal such as is found in containers having a threaded neck, for use with a threaded cap. The inner seal is usually die-cut from the aforementioned multi-layered sheet of metal foil bearing a layer of heat sealable material. The inner seal is then inserted into the cap, and the cap is twisted onto the neck of the container. The capped container is then heated by means of induction to heat the aluminum foil and thereby melt the layer of heat sealable material so that the inner seal will be bonded to the container.

Whether used to seal blister type packages or the opening of a bottle like container it is desirable that the seals exhibit resistance to tearing, including biting. The latter is particularly important when it is desired to prevent children from accessing the package contents.

Materials used for making such peelable seals include biaxially oriented polyester film such as Mylar® with an amorphous polyester heat seal layer coated thereon. The seal may further comprise printed indicia on an exposed surface of the Mylar® sheet. The indicia may further be covered by a second Mylar® polyester film layer. In an alternative arrangement a second Mylar® film layer having reversed printed indicia on one surface is adhered to the upper surface of the seal so that the printed indicia appear properly oriented and protected by the Mylar® film.

Other known structures include Mylar® RL43 coated with an ethylene vinyl acetate (EVA) heat activated seal to provide a peelable seal. For the reasons discussed earlier, lid seals must provide resistance to tearing particularly during the pealing step, be reasonably flexible, be resistant to water or at least to moisture, be heat resistant when used to seal containers containing materials that need heating such as food, accept printing on at least an exposed surface thereof, and be inexpensive to produce. In addition, it is desirable that such seals be made so that they present few if any disposal problems, and be environmentally friendly.

U.S. Pat. No. 5,372,268 issued to Han and assigned to the 3M Company discloses a multilayer structure for use as a heat seal. Such structure comprises (a) a layer of sealing material for bonding the seal to the container, (b) a layer that is substantially impermeable to air and moisture, and (c) a layer of reinforcing material. The layer of sealing material can be formed from any suitable adhesive, such as, for example, a heat sealable film, a hot melt adhesive, a tack-free pressure-activated adhesive, or a shear-activated adhesive. The impermeable layer can be formed from polymeric film, e.g., poly(vinyl chloride), or metal foil, e.g., aluminum foil. The reinforcing layer is a multi-ply film consisting of at least two plies of monoaxially oriented films that are laminated together with the strong direction of one ply crossing the weak direction of another ply to impart equal strength in all directions such that the tear and tensile strengths are increased in the machine direction, the cross direction, and in a diagonal direction.

The use of chemically dissimilar materials to form the seal as disclosed in the prior art tends to increase the thickness and stiffness of the final product, as well as the manufacturing costs by increasing the number of material layers used and the complexity of the manufacturing steps when one attempts to satisfy all of the above stated desirable attributes of a seal material. In particular, disposal of waste material generated during the manufacturing and use of the webs used to form the seals presents a disposal problem. Such problem is all the more vexing when the web produced exhibits the desirable characteristics of high resistance to tearing and imperviousness to humidity or water. There is, therefore, still need for a material for use as a sealing lid for containers that is relatively easy and inexpensive to fabricate, exhibits the high degree of tear resistance that is desirable for such lids, and which may be conveniently disposed of when necessary.

SUMMARY OF THE INVENTION

According to the present invention there is provided a seal for containers that exhibits resistance to puncture and tearing through the use as part of the seal structure of a tear resistant multilayer structure that consists of:

a) an oriented polymer film layer having a top surface and a inner surface;

b) a thermal bonding polymer layer on the oriented polymer layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer.

Still according to this invention, the polymer film layer and the bonding polymer layer are co-extruded layers having a chemical composition that permits recycling without separating the layers. Preferably the scrim as well has a similar chemical composition, permitting recycling following lamination. Such selection of materials permits the recovery of waste material during production runs by the simple recycling of the complete laminated structure. Recycling as used in this invention means the ability to reuse the material in the same or similar process. Ability to be used means that the recycled material can be used in proportions of a 20–70% by weight in the product using the recycled material. For example, waste polyester production run material may be shredded and then reused in for example, a palletizing extruder, such as is well known in the art, to make recycled pellets. The recycled polyester pellets can be mixed with fresh or virgin polyester polymer, and the mixture re-melted and re-extruded to produce an oriented film or other product.

A thermally activated adhesive layer may be coated on the bottom surface of the reinforcing scrim layer to provide the necessary adhesive for attaching the seal to a container opening.

Still in accordance with the present invention, the thermal bonding polymer layer, and the reinforcing scrim polymer layer each individually comprise a synthetic condensation polymer. The synthetic condensation polymers each comprises, in polymerized form:

(a) a carboxylic acid or a mixture of carboxylic acids, and
  b) either i) a diamine or a mixture of diamines, or ii) a diol or a mixture of diols, or
(b) an ω-amino acid having more than 2 carbon atoms, or a mixture of such amino acids. For the structure taken as a whole, (1) at least 90 mol % of a combined total amount of the carboxylic acid or the mixture of carboxylic acids in the synthetic condensation polymers is the same carboxylic acid, (2) at least 90 mol % of a combined total amount of the diamine or the mixture of diamines in the synthetic condensation polymers is the same diamine, (3) at least 90 mol % of a combined total amount of the diols or the mixture of diols in the synthetic condensation polymers is the same diol, and (4) at least 90 mol % of a combined total amount of the amino acid or the mixture of amino acids in the synthetic condensation polymers is the same amino acid.

The oriented polymer film layer may be biaxially oriented polyethylene terephthalate.

In accordance with this invention there is also contemplated attaching the opening of a container such as a bottle mouth or the top, open side of a blister package to the underside of the scrim layer, using a thermally activated adhesive that permits pealing the seal from the package.

DETAILED DESCRIPTION OF THE INVENTION

The invention will next be described with reference to the figures wherein same numbers indicate same features. The figures are provided for illustration and explanation of this invention and are, therefore not drawn to scale nor are they intended as engineering drawings for use in a manufacturing process. Thus certain elements are exaggerated while elements not needed to understand this invention are not shown or shown in part only.

Figure 1:
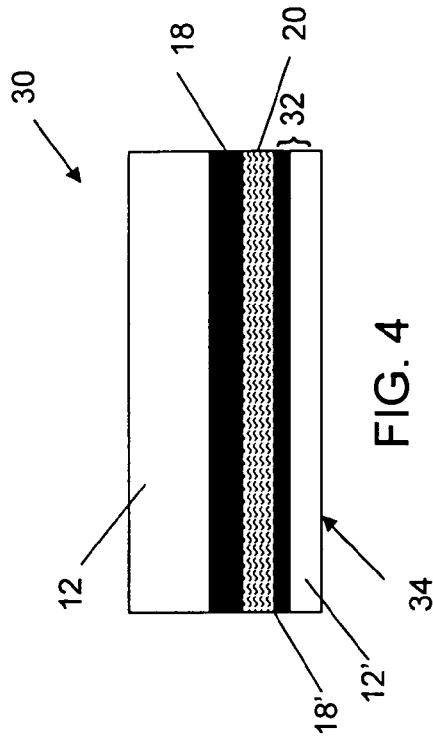
FIG. 1 shows in schematic cross sectional representation a multilayer seal structure according to this invention.

Referring next to FIG. 1 there is shown an embodiment of a tear resistant seal or lid structure 10 according to the present invention. The seal consists of at least three layers. Additional layers may be present either over or under the three layers shown, but are not shown as they are not essential in explaining this invention. The three layers that form the tear resisting portion of the seal are top layer 12, a bonding layer 18 and a reinforcing scrim layer 20.

Top layer 12 is an oriented polymer film layer 12 that may be produced from a linear polyester. Typically the linear polyester will have an intrinsic viscosity from about 0.5 to about 0.8, with about 0.6 being most typical. Preferred polyester films are biaxially oriented polyethylene terephthalate (PET) film and biaxially oriented polyethylene naphthalate (PEN) film.

Especially useful is polyethylene terephthalate that has been biaxially oriented and heat set. Such a material is well known in the art, and is described for example in U.S. Pat. No. 4,375,494 to Stokes, incorporated herein by reference.

Polyethylene terephthalate polymer preparation techniques are well known to those skilled in the art and are disclosed in many texts, such as Encyclopedia of Polymer Science and Engineering, 2nd. Ed., Vol. 12, Wiley, N.Y., pp. 1–313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalene dicarboxylic acid or an ester thereof.

Oriented polymer film layer 12 may also comprise a particulate additive, for example to improve the visual appearance of the product or to modify the permeability of the composite paperboard structure to water vapor or other gasses. One example of a film containing such a particulate additive is a biaxially oriented polyethylene terephthalate containing approximately 15% of titanium dioxide, commercially available from Dupont Teijin Films of Wilmington, Del., under the name Mylar® 365T. Another is Melinex® 389 which contains a UV absorber. Other types and amounts of particulate additives such as for example a flame retardant additive, clay, talc, and silica may also be used according to the invention. Because the additives amounts used are small, recycling manufacturing waste product remains possible.

The oriented polymer film 12 has a top surface 14 and an inner surface 16. Adhered to the inner surface 16 is thermal bonding polymer layer 18. Thermal bonding polymer layer 18 is capable of forming an adhesive bond to oriented polymer film layer 12 and to an inner surface of a reinforcing scrim polymer layer 20, to be described shortly. Typically, thermal bonding polymer layer 18 is formed on a surface of oriented polymer film layer 16 to form a film composite. The composite is subsequently attached to reinforcing scrim polymer layer 20 by applying pressure and by heating to a temperature high enough to soften layer 18 but not high enough to soften or melt the oriented polymer film layer 16 or the reinforcing scrim polymer layer 20.

Thermal bonding polymer layer 18 may comprise a polyester resin, particularly a co polyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Thermal bonding polymer layer 18 may comprise a terephthalate-containing polyester. A preferred co polyester is derived from terephthalic acid and one or both of isophthalic acid and hexahydroterephthalic acid, and one or more glycols, preferably ethylene glycol. Exemplary co polyesters that provide satisfactory bonding properties in the amorphous state are those of ethylene terephthalate and ethylene isophthalate, especially in the molar ratios 60 to 90 mol % ethylene terephthalate and correspondingly 40 to 10 mol % ethylene isophthalate. Particularly preferred co polyesters comprise 70 to 85 mol % ethylene terephthalate and 30 to 15 mol % ethylene isophthalate, for example a co polyester of approximately 82 mol % ethylene terephthalate and approximately 18 mol % ethylene isophthalate.

In manufacturing seal structures according to the invention, it is preferred to provide oriented polymer film layer 12 and thermal bonding polymer layer 18 together in the form of a film composite having a thickness between 0.20 thousands of an inch (mills) to 3 mills, and more preferably between 0.50 to 1.4 mills.

In the case where oriented polymer film layer 12 is biaxially oriented polyethylene terephthalate and thermal bonding polymer layer 18 is a co polyester resin as described above, the film composite may be conveniently made by a process that includes multiple extrusion through a multiple orifice die or co extrusion of the composite layers, e.g. broadly as described in U.S. Pat. No. 3,871,947, followed by molecular orientation by stretching in one or more directions and heat setting. A convenient process and apparatus for co extrusion, known as single channel co extrusion, is described in U.S. Pat. No. 4,165,210. The method comprises simultaneously extruding streams of the first and second polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced.

Biaxial orientation of the polyethylene terephthalate oriented polymer film layer of the film composite may be accomplished by stretching the composite in sequence in two mutually perpendicular directions typically at temperatures in the range of about 78 to 125° C. Generally, the conditions applied for stretching the composite may function to partially crystallize the thermal bonding polymer layer, and in such cases it is preferred to heat set the film composite under dimensional restraint at a temperature greater than the crystalline melting temperature of the thermal bonding polymer layer, but lower than the crystalline melting temperature of the polyethylene terephthalate oriented polymer film layer. The composite is then permitted or caused to cool, rendering the thermal bonding polymer layer essentially amorphous while high crystallinity is maintained in the oriented polymer film layer. Therefore, the stretching operation is preferably followed by heat setting under dimensional restraint, typically at a temperature in the range 150 to 250° C. Convenient processes for stretching and heat setting are described in U.S. Pat. No. 3,107,139. Thus in one embodiment of the invention, the tear resistant seal or lid structure 10 comprises a film composite formed by co extrusion so that it comprises two layers made of different materials, but forming one sheet of film.

Co extruded film composites of the sort described here, incorporating an oriented polymer film layer 12 and a thermal bonding polymer layer 18, are commercially available from DuPont Teijin Films of Wilmington, Del., under the name Melinex® 301H.

The above described composite is laminated to reinforcing scrim layer 20. Suitable examples of materials for making reinforcing scrim polymer layer 20 are woven or non woven fibrous materials comprising polyester. One suitable non woven scrim, a spun bonded polyester product, is available from BBA Filtration (division of BBA Nonwovens, Nashville, Tenn.) under the name StarWeb® 2253C, and has a basis weight of about 18 g/m$^2$ and a thickness of 0.0038 inches. Another suitable non woven scrim, also available from BBA Filtration, is Reemay® 2004 spun bonded polyester, which has a basis weight of about 14 g/m$^2$. Non woven scrims suitable for use in this invention have a basis weight typically in the range of about 5 to about 100 g/m$^2$, preferably from about 10 to about 20 g/m$^2$.

Woven scrims (bi or tri-dimensional) may also be used, especially when a high level of tensile and/or tear strength is desired, and these may vary in basis weight from about 15 to about 300 g/m$^2$. They may be made from any of a variety of polyesters, including but not limited to polyethylene terephthalate and polyethylene naphthalate.

Figure 2:
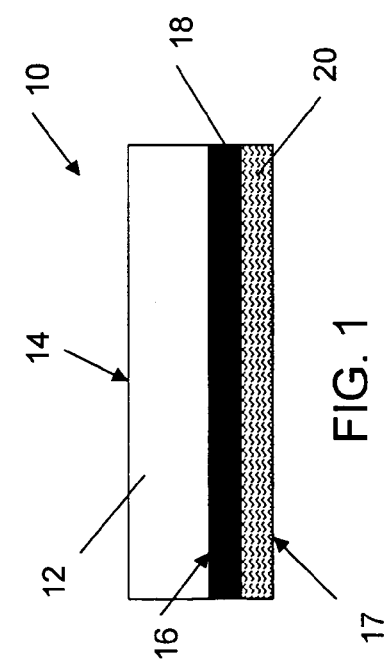
FIG. 2 shows a blister package attached to the seal in accordance with the present invention.

Referring next to FIG. 2 there is shown attached to the underside of the structure of FIG. 1 a blister type package 22 for containing a product 21. The blister type container is peelably adhered to the bottom surface 17 of the scrim layer 20 through an adhesive layer 24. Adhesive layer 24 may be a solvent borne EVA solution coated at weights from 2 to 25 gr/m$^2$ with 6 to 16 gr/m$^2$ a preferred range onto the bottom surface of the scrim layer, preferably in a separate step following lamination of the scrim layer to the co-extruded composite oriented film plus thermal bonding layer. Preferably, a solvent borne polyester may be used, or an aqueous adhesive such as an acrylic, EVA, or polyester. Alternatively, the adhesive layer 24 may be extruded onto the scrim layer bottom surface.

The adhesive may also be applied onto the exposed surface 26 of the container that will contact the seal. The adhesive is typically applied as a continuous layer however it may also be applied by printing in selected areas, for example as a thin bead of adhesive around the lip of the blister package, or as a corresponding bead on the scrim bottom surface. Typically the adhesive is a heat activated adhesive, but may also be a contact adhesive. The technology for making and sealing blister and bottle packages is well known and equipment to perform these functions is commercially available including equipment from Klöckner Medipak Inc of Clearwater, Fla.

Figure 3:
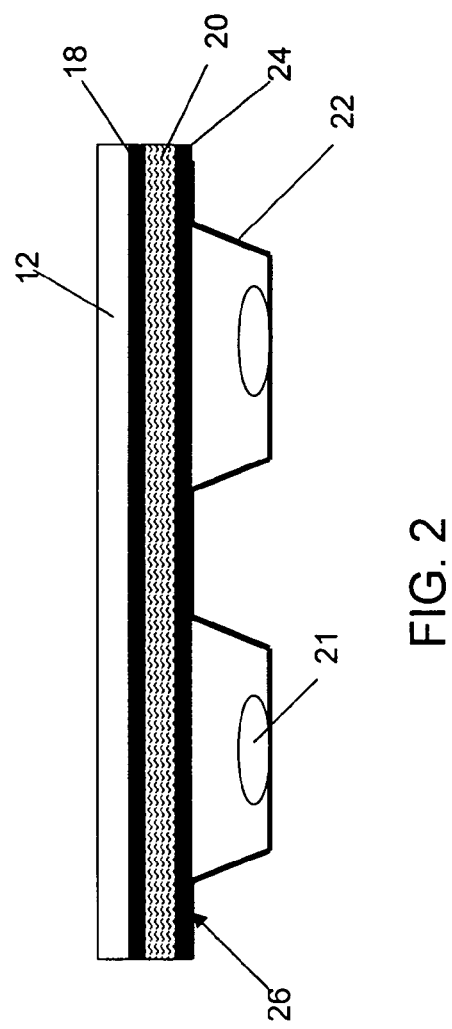
FIG. 3 shows an alternate embodiment where the seal is attached to a bottle shaped container.

FIG. 3 shows another application of the seal according to this invention. In this instance the seal is used to seal the mouth of a bottle type container 26 typical of containers for medications in the form of pills or capsules. In such case the seal is cut from a larger sheet of seal material to a shape and size and adhered thereto using an adhesive 24' applied to the underside of that corresponds to the bottle mouth. Again this may be a continuous layer as described in the case of the blister package, or may be an adhesive layer coated onto the upper surface of the bottle mouth. Preferably the seal contains a small tab to facilitate removal.

The top surface 14 may include printed indicia 22 as shown in FIG. 3. Such indicia may contain logos, images, instructions etc. It is, therefore preferred that the layer 12 exhibit good printability characteristics. In order to improve the ink retention properties of the polyethylene terephthalate, the polyethylene terephthalate film side of such a film composite can optionally be coated via an in-line gravure coater with a primer material that improves its adhesion to water-based and solvent-based coatings and adhesives, thus providing a surface that is more easily printed on, for example. Printing primers are typically based on aqueous polymer dispersions, emulsions or solutions of acrylic, urethane, polyester or other resins well known in the art. An example of one such coating, containing at least one sulfopolyester, at least one tetrablock copolymer resin, and at least one acrylamide/acrylic acid copolymer or salts thereof, is disclosed in U.S. Pat. No. 5,985,437 to Chappell et al. A commercially available polyester film primed for printing and useful in practicing this invention is available from E. I. Dupont de Nemours and Co. Inc. of Wilmington, Del., under the trade name Mylar® 854.

Depending on the intended function of the seal, additional coatings or layers may be applied to the top surface 14. For example, such coatings or layers may include gas and water vapor barrier coatings i.e. vacuum deposited aluminum, or polymeric barrier coatings composed of resins such as Saran®, a PVdC resin produced by Dow Chemical Corp., PVA as a gas barrier, EVOH, SiOx etc. Such layers may be applied by coating out of an aqueous process, a non aqueous solvent based process or a solventless process such as sputtering. Other possible layers may include the provision of special function layers. By special function layers it is meant layers intended to a particular type of protection such as anti-microbial layers, security/anticounterfeiting/brand protection devices, i.e. holographic images, chemical dyes and markers, luminescent photochemical coatings etc.

Figure 4:
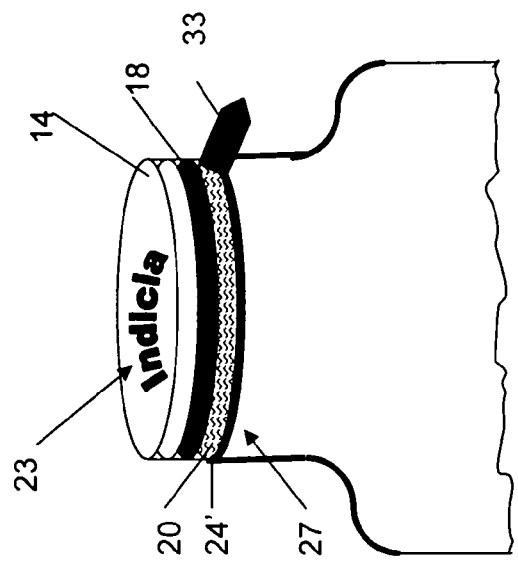
FIG. 4 shows an alternate embodiment of the seal comprising an optional additional layer.

In yet another embodiment, shown in FIG. 4, the seal structure 32 may further include a second combined film/bonding layer 32 consisting of bonding layer 18' and oriented film layer 12' to provide additional tear resistance. The second combined layer 30 is then laminated to the bottom surface of the reinforcing scrim layer 20. The second combined layer must again have a chemical composition that will permit recycling of the complete structure 30 without separating the layers An adhesive layer not shown, may be coated onto the exposed surface 34 of the second combined layer 30, similar in composition and application method as described above for the embodiment of FIG. 2.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A seal for sealing a container opening, said seal comprising at least one tear resisting composite layer providing tear resistance to said seal the composite layer consisting of:
    a) an oriented polymer film layer having a top surface and a inner surface;
    b) a thermal bonding polymer layer on said oriented polymer layer inner surface substantially coextensive thereto, said thermal bonding polymer layer having a thickness between 10% and 40% of a combined thickness of the oriented polymer film layer and the thermal bonding polymer layer; and
    c) a reinforcing scrim polymer layer also having an inner surface adjacent and substantially coextensive with the thermal bonding polymer layer said reinforcing having a bottom surface;
    wherein the oriented polymer film layer, the thermal bonding polymer layer, and the reinforcing scrim polymer layer in said tear resisting composite layer each individually comprise a synthetic condensation polymer,
    the synthetic condensation polymers each comprising, in polymerized form:
        1) a) a carboxylic acid or a mixture of carboxylic acids, and b) either i) a diamine or a mixture of diamines, or ii) a diol or a mixture of diols, or
        2) an ω-amino acid having more than 2 carbon atoms, or a mixture of such amino acids,
    wherein, for the composite taken as a whole,
    at least 90 mol % of a combined total amount of the carboxylic acid or the mixture of carboxylic acids in the synthetic condensation polymers is the same carboxylic acid,
    at least 90 mol % of a combined total amount of the diamine or the mixture of diamines in the synthetic condensation polymers is the same diamine,
    at least 90 mol % of a combined total amount of the diols or the mixture of diols in the synthetic condensation polymers is the same diol, and
    at least 90 mol % of a combined total amount of the amino acid or the mixture of amino acids in the synthetic condensation polymers is the same amino acid.

2. The seal according to claim 1 wherein the combined thickness of said polymeric layer and said bonding layer is between about 0.00020 inches and 0.003 inches.

3. The seal according to claim 2 wherein the polymer film layer, the bonding polymer layer and the reinforcing scrim in said tear resisting composite layer all have a chemical composition that permits recycling said composite without separating the layers thereof.

4. The seal according to claim 3 further comprising an adhesive layer on said bottom surface of said reinforcing scrim layer.

5. The seal according to claim 3 wherein said adhesive layer also has a chemical composition that permits recycling said composite without separating the layers thereof.

6. The seal according to claim 4 wherein said adhesive layer is a thermally activated adhesive layer.

7. The seal according to claim 1, wherein the oriented polymer film layer comprises biaxially oriented polyethylene terephthalate.

8. The seal according to claim 1 wherein said structure further comprises a thermally activated adhesive layer on said bottom surface of said reinforcing scrim layer.

9. The seal according to claim 3 further comprising a blister package adhered to said scrim layer bottom surface.

10. The seal according to claim 9 wherein said blister package is peelably adhered to said scrim layer bottom surface through a heat activated adhesive.

11. The seal according to claim 10 further comprising a blister package adhered to said bottom surface of said scrim layer and wherein said blister package includes a surface adapted for adhesion to said tear resisting composite layer and an adhesive is coated on said surface adapted for adhesion.

12. The seal according to claim 3 wherein at least one of said oriented polymer layer top surface and said oriented polymer layer inner surface contains printed indicia.

13. The seal according to claim 3 wherein the tear resisting composite layer further consists of an additional thermal bonding polymer layer on said bottom surface of said scrim layer and an additional polymer film layer, and wherein all such layers have a chemical composition that permits recycling said composite without separating said layers.

14. The seal according to claim 3 further comprising a container having an opening and wherein said seal is peelably adhered to and seals said container opening.

15. The seal according to claim 3 further comprising at least one special function layer.

* * * * *